(12) United States Patent
Otto et al.

(10) Patent No.: US 9,989,277 B2
(45) Date of Patent: Jun. 5, 2018

(54) HEATING DEVICE

(75) Inventors: Peter Otto, Otterfing (DE); Christian Bäcker, Fürstenfeldbruck (DE); Michael Pöhner, München (DE)

(73) Assignee: WEBASTO SE, Stockdorf (DE)

( * ) Notice: Subject to any disclaimer, the term of this patent is extended or adjusted under 35 U.S.C. 154(b) by 1296 days.

(21) Appl. No.: 13/496,828

(22) PCT Filed: Nov. 10, 2010

(86) PCT No.: PCT/DE2010/075127
§ 371 (c)(1),
(2), (4) Date: Jun. 15, 2012

(87) PCT Pub. No.: WO2011/060778
PCT Pub. Date: May 26, 2011

(65) Prior Publication Data
US 2012/0251965 A1   Oct. 4, 2012

(30) Foreign Application Priority Data

Nov. 20, 2009   (DE) .................. 10 2009 044 608

(51) Int. Cl.
*F24H 3/02* (2006.01)
*F23N 1/08* (2006.01)
(Continued)

(52) U.S. Cl.
CPC ............ *F24H 3/025* (2013.01); *B60H 1/2206* (2013.01); *B60H 1/2212* (2013.01); *F23N 1/082* (2013.01);
(Continued)

(58) Field of Classification Search
USPC ........... 432/29, 222; 126/110 D, 116 A, 112, 126/110 E
See application file for complete search history.

(56) References Cited

U.S. PATENT DOCUMENTS 2,838,042 A * 6/1958 Tze-Ning Chen ........ 126/110 B
5,341,274 A   8/1994 Nakatani et al.
(Continued)

FOREIGN PATENT DOCUMENTS

CN   1139480 A    1/1997
DE   19548225 A1  6/1997
(Continued)

OTHER PUBLICATIONS

EP1950496A2—machine translation.*
International Search Report corresponding to International Application No. PCT/DE2010/075127.

*Primary Examiner* — Nathaniel Herzfeld
(74) *Attorney, Agent, or Firm* — Fitch, Even, Tabin & Flannery LLP

(57) ABSTRACT

The invention relates to a heating device, in particular for mobile use, comprising a combustion chamber for reacting fuel with combustion air in order to release heat, a heat exchanger for transferring at least part of the released heat to a heating medium to be heated, a fuel conveying device for supplying fuel to the combustion chamber, a combustion air fan for supplying combustion air to the combustion chamber, a heating medium fan for supplying the heating medium to the heat exchanger, a common drive for the combustion air fan and the heating medium fan, at least one sensor for monitoring the mass flow of the heating medium, and a controller, which controls the fuel conveying device and the common drive. The controller is designed to change the ratio of the amount of the heating medium and the amount of the fuel supplied to the combustion chamber according to the mass flow of the heating medium.

7 Claims, 2 Drawing Sheets

(51) Int. Cl.
*F24H 9/20* (2006.01)
*B60H 1/22* (2006.01)

(52) U.S. Cl.
CPC ... *F24H 9/2085* (2013.01); *B60H 2001/2231* (2013.01); *F23N 2025/19* (2013.01); *F23N 2033/08* (2013.01); *F23N 2033/10* (2013.01); *F23N 2041/14* (2013.01)

(56) References Cited

U.S. PATENT DOCUMENTS

| | | | |
|---|---|---|---|
| 5,449,863 | A | 9/1995 | Nakatani et al. |
| 5,466,893 | A | 11/1995 | Nakatani et al. |
| 5,702,055 | A | 12/1997 | Humburg |
| 5,788,148 | A * | 8/1998 | Burner et al. ........... 237/2 A |
| 6,021,752 | A * | 2/2000 | Wahle et al. ........ 123/142.5 R |
| 6,089,221 | A | 7/2000 | Mano et al. |
| 6,106,282 | A * | 8/2000 | Humburg et al. ........... 432/222 |
| 2002/0117551 | A1 * | 8/2002 | Wolf ............... B60H 1/2212 237/12.3 C |
| 2002/0119408 | A1 * | 8/2002 | Eberspach et al. ............ 431/12 |
| 2004/0261831 | A1 * | 12/2004 | Tsuneoka et al. ............ 136/205 |
| 2008/0190402 | A1 | 8/2008 | Schmidt et al. |

FOREIGN PATENT DOCUMENTS

| | | |
|---|---|---|
| DE | 19906285 A1 | 8/2000 |
| DE | 10050513 A1 | 4/2002 |
| DE | 10063922 C1 | 7/2002 |
| DE | 102004049905 A1 | 4/2006 |
| DE | 102007003438 A1 | 7/2008 |
| EP | 1950496 A2 * | 7/2008 |
| JP | 2007-308133 A | 11/2007 |
| KR | 0123805 B1 | 12/1997 |
| KR | 10 2008 0012279 A | 2/2008 |
| RU | 2149321 C1 | 5/2000 |
| WO | 2004000590 A1 | 12/2003 |

* cited by examiner

HEATING DEVICE

CROSS-REFERENCE TO RELATED APPLICATIONS

This Application is the U.S. National Phase Application filed under 35 U.S.C. § 371 of International Application No. PCT/DE2010/075127, filed Nov. 10, 2010, designating the United States, which claims priority from German Patent Application No.: 10 2009 044 608.7, filed Nov. 20, 2009, which are hereby incorporated herein by reference in their entirety for all purposes.

The present invention relates to a heater, in particular for mobile use, and to a method for controlling a heater of this kind.

Heaters for mobile use or for mobile applications (referred to below as mobile heaters) are used as park or auxiliary heaters, especially in the vehicle sector. Park heaters (or park heating systems) can be operated both when the vehicle engine is at rest and when it is running, while auxiliary heaters can be operated only when the vehicle engine is running.

In heaters of this kind, fuel is generally converted with combustion air to generate heat for heating. For this purpose, mobile heaters of this kind have a combustion chamber, in which conversion generally takes place in a combustion process which involves a flame. The practice of operating mobile heaters of this kind with liquid fuels, e.g. diesel, gasoline or ethanol, or with gaseous fuels is known.

In the case of mobile heaters, a distinction is drawn between liquid or water heaters, in which the heat released is transferred in a heat exchanger of the heater to liquid as the heating medium (generally engine coolant), and air heaters, in which the heat released is transferred in a heat exchanger of the heater to air as the heating medium. Air heaters are generally designed in such a way that the heat released is transferred in the heat exchanger directly to air which is fed to an area to be heated, in particular a vehicle interior.

To enable heaters of this kind to be operated, both fuel and combustion air must be fed to the combustion chamber. The fuel can be fed to the combustion chamber in precisely predetermined quantities by means of a fuel delivery device, e.g. a metering pump. The combustion air can be fed to the combustion chamber by means of a combustion air blower, which is driven by means of an electric motor. The combustion air ratio $\lambda$ (also referred to as the air factor or air ratio) for conversion in the combustion chamber is determined by the ratio of the quantity of fuel supplied to the quantity of combustion air supplied. The combustion air ratio $\lambda$ in such a setup is thus determined by means of the rotational speed of the combustion air blower and the delivery rate of the fuel delivery device.

Operation of the heater furthermore requires that the heating medium to be heated should be passed through the heat exchanger. In the case of air heaters, this can be accomplished by means of a heating medium blower.

It is the object of the present invention to provide an improved heater and an improved method for operating a heater.

The object is achieved by means of a heater as claimed in claim 1. Advantageous developments are indicated in the dependent claims.

The heater has a combustion chamber for converting fuel with combustion air in order to release heat, a heat exchanger for transferring at least some of the heat released to a heating medium to be heated, a fuel delivery device for feeding fuel to the combustion chamber, a combustion air blower for feeding combustion air to the combustion chamber, a heating medium blower for delivering the heating medium, a common drive for the combustion air blower and the heating medium blower, at least one sensor for monitoring the mass flow of the heating medium, and a controller, which controls the fuel delivery device and the common drive. The controller is designed to vary the ratio between the quantity of combustion air and the quantity of fuel fed to the combustion chamber in dependence of the mass flow of the heating medium. The term "common drive" for the combustion air blower and the heating medium blower is taken to mean that the combustion air blower and the heating medium blower are coupled to the common drive in such a way that a rotational speed of the combustion air blower is in a fixed relationship with a rotational speed of the heating medium blower. The combustion air blower and the heating medium blower can be coupled to the common drive in such a way, for example, that they have the same rotational speed, being connected to a common drive by a common shaft, for example. The at least one sensor for monitoring the mass flow of the heating medium can be a mass flow sensor, for example, which measures the mass flow directly, but it can also be formed by a sensor which detects the mass flow of the heating medium only indirectly. For example, the at least one sensor for monitoring the mass flow of the heating medium can be formed by a temperature sensor, which measures the exit temperature of the heating medium from the heater. From the measured exit temperature, it is possible to infer the mass flow of the heating medium. In particular, a temperature sensor of this kind can be used to determine that the mass flow of the heating medium is too low if the measured temperature exceeds a predetermined limiting value. However, the monitoring of the mass flow can also be accomplished by monitoring the temperature difference between an intake temperature of the heating medium and an exit temperature of the heating medium, for example. Since the controller is designed to vary the ratio between the quantity of heating medium and the quantity of fuel fed to the combustion chamber, a change in the rotational speed of the combustion air blower and hence of the combustion air mass flow (over an appropriate range) at a predetermined delivery rate of the fuel (due to the common drive) is permitted. Thus, it is not a matter of predetermining a particular combustion air factor $\lambda$ and then adjusting to this factor but of permitting variation of the combustion air factor $\lambda$ (within predetermined limits). This makes it possible to vary the mass flow of the heating medium at a given delivery rate of the fuel delivery device while using a compact and low-cost common drive for the combustion air blower and the heating medium blower. By virtue of this configuration, there is no need for the heating medium blower to be operated at a high blower power of the heating medium blower, whatever the operating conditions or the application. In this way, it is possible to make a significant reduction in the average power consumption, and the average noise level due to flow noises caused by the heating medium can be reduced. The variation in dependence of the mass flow of the heating medium can be performed directly, on the basis of a measured mass flow, for example (e.g. where the sensor measures the mass flow directly) or indirectly on the basis of a measurement signal which allows inferences as to the mass flow of the heating medium, e.g. a measured temperature of the heating medium at an outlet of the heater (exit temperature) or the temperature difference between the intake temperature (upstream of the heat exchanger) of the heating medium and the exit temperature of the heating medium. The term "mass flow" is taken to mean the mass of heating medium per unit time. The controller is preferably designed to vary the ratio between the quantity of fuel fed to the combustion chamber and the quantity of combustion air fed to the combustion chamber in dependence of the mass flow of the heating medium.

According to one embodiment, the controller is designed to vary a rotational speed of the common drive in dependence of the mass flow of the heating medium while the delivery rate of the fuel delivery device remains the same. By varying the rotational speed of the common drive in dependence of the mass flow of the heating medium, the heating medium blower can be operated at a blower power which is matched to the actual circumstances of the respective operating state or the respective application.

According to one embodiment, the controller is designed to increase the rotational speed of the common drive if the mass flow of the heating medium is too low. In this embodiment, the mass flow of the heating medium can be increased by increasing the rotational speed. No change in the delivery rate of the fuel delivery device is required here. In particular, the common drive (and hence the heating medium blower) in this embodiment can always be operated at a rotational speed which corresponds to a lower limit of a predetermined rotational speed range (predetermined for the respective delivery rate of the fuel), and the rotational speed is increased only if the monitored mass flow of the heating medium is too low. The heating medium blower is thus only ever operated at the required blower power, and therefore the power consumption is reduced and the noise level is lowered. The assessment of whether the mass flow is too low can be accomplished by comparing a measured mass flow with a preset setpoint, for example. In the case where monitoring of the mass flow is accomplished by means of a temperature sensor, a mass flow which is too low can be inferred if the measured temperature exceeds a preset setpoint, for example.

According to one embodiment, the controller is designed to vary the rotational speed of the common drive within a rotational speed range specific to the delivery rate of the fuel delivery device. In this case, a rotational speed interval as a function of the delivery rate is permitted, i.e. an upper limit and a lower limit of the rotational speed range as a function of the delivery rate are predetermined. In other words, a $\lambda$ operating characteristic field is specified, rather than a $\lambda$ operating characteristic curve. Specifying the specific rotational speed range ensures that the combustion air factor $\lambda$ can be varied only in a limited range, thus ensuring that the heater is always in a permissible range in terms of the combustion process and emissions limits.

According to one embodiment, the controller is designed to operate the common drive at a rotational speed which corresponds to a lower limit of the rotational speed range, and to increase the rotational speed only if the mass flow of the heating medium is too low. In this case, it is ensured that the heating medium blower is always operated at a moderate blower power, which does not exceed the required amount.

According to one embodiment, the controller is designed to reduce the delivery rate of the fuel delivery device if the mass flow of the heating medium is too low and the rotational speed of the common drive corresponds to an upper limit of the rotational speed range. In this case, it is possible to prevent the occurrence of overheating of the heater or of downstream components due to an excessively low mass flow in a particularly reliable manner. In particular, if as low as possible a rotational speed is always selected initially and the rotational speed is increased sequentially up to the upper limit as long as the mass flow of the heating medium is too low, and the delivery rate of the fuel delivery device is reduced only when the upper limit is reached, it is in this way advantageously possible to introduce heat reliably into the area to be heated, even in adverse conditions, without the need to lower the heat output in the heater prematurely.

According to one embodiment, the at least one sensor for monitoring the mass flow of the heating medium is a temperature sensor for detecting the temperature of the heated heating medium. A temperature sensor of this kind can be provided at reasonable cost. An excessively low mass flow of the heating medium can be reliably detected by comparing the measured temperature of the heating medium with a reference temperature.

According to one embodiment, a temperature sensor for detecting the temperature of the heating medium is provided upstream of the heat exchanger. In this case, the mass flow of the heating medium can be reliably determined from the temperature difference between an intake temperature of the heating medium and an exit temperature of the heating medium and the delivery rate of the fuel delivery device.

According to one embodiment, the heater is designed as an air heater, in which the heat released is transferred in the heat exchanger to air as the heating medium to be heated.

The object is also achieved by a method for operating a heater as claimed in claim 10. Advantageous developments will become apparent from the dependent claims.

The method is designed for the operation of a heater which has: a combustion chamber for converting fuel and combustion air in order to release heat, a fuel delivery device for feeding fuel to the combustion chamber and a combustion air blower for feeding combustion air to the combustion chamber, a heating medium blower for delivering a heating medium to be heated. In this arrangement, the combustion air blower and the heating medium blower are driven by means of a common drive. The method has the following steps:—monitoring a mass flow of the heating medium and—varying the ratio between the quantity of heating medium and the quantity of fuel fed to the combustion chamber in dependence of the mass flow of the heating medium. By means of the method, the advantages described above in relation to the heater are achieved. In particular, a reduction in the mean power consumption of the heating medium blower and a reduction in the noise level are achieved.

According to one implementation, the method has the following step:—varying a rotational speed of the common drive in dependence of the mass flow of the heating medium while the delivery rate of the fuel delivery device remains the same. In this case, the heater can be operated at a heating medium blower power which is matched to the respective operating conditions.

According to one implementation, the method has the following step:—increasing the rotational speed of the common drive if the mass flow of the heating medium is too low. This ensures that the heating medium blower is only ever operated at a low rotational speed sufficient to maintain an adequate mass flow. If the mass flow falls to too low a level, this is reliably counteracted.

According to one embodiment, the mass flow of the heating medium is monitored by comparing a temperature of the heated medium with a reference value. In this case, the monitoring of the mass flow of the heating medium is reliably achieved at a particularly reasonable cost.

According to one embodiment, the mass flow of the heating medium is inferred to be too low if the temperature of the heated heating medium exceeds the reference value. In this case, the mass flow of the heating medium is monitored in a very simple and efficient way.

If the mass flow of the heating medium is monitored by monitoring the temperature of the heating medium before heating and the temperature of the heated heating medium, the mass flow can be reliably monitored. Monitoring can be performed by means of sensors which can also be used for other functions of the heater.

Further advantages and developments will become apparent from the following description of embodiments with reference to the attached drawings.

Figure 1:
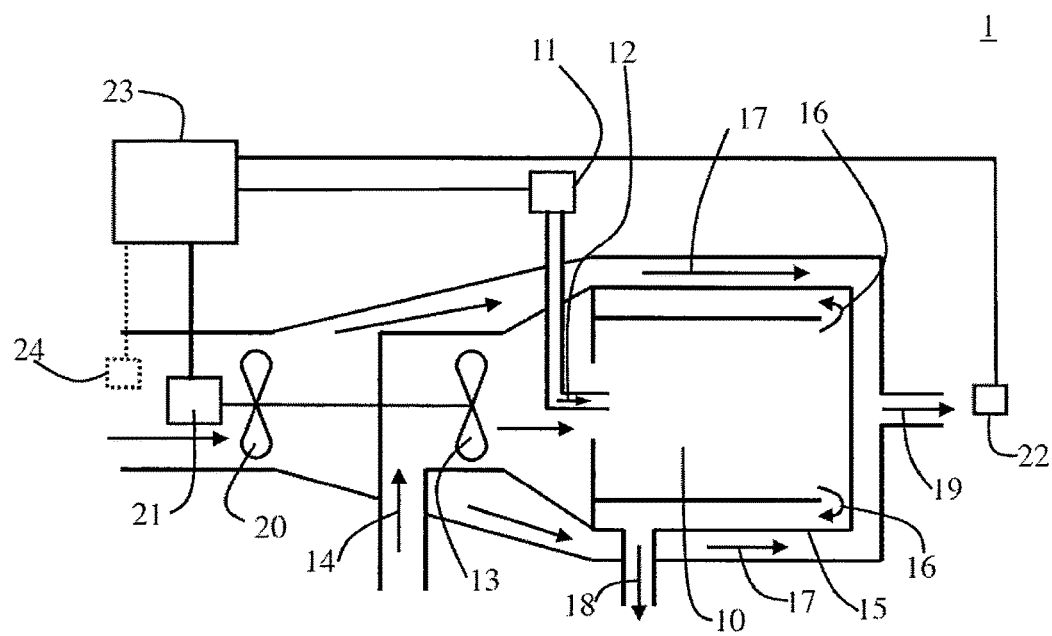
FIG. 1 is a schematic representation of a heater according to one embodiment.

One embodiment is described below with reference to FIGS. 1 to 3. The heater 1 illustrated schematically in FIG. 1 is designed as an air heater, i.e. the heating medium to be heated is formed by air in this embodiment. The heater 1 according to the embodiment is designed as a mobile heater, in particular as a motor vehicle heater. The heater 1 can be formed by a park heater or an auxiliary heater, for example.

The heater 1 has a combustion chamber 10, in which fuel is converted with combustion air to release heat for heating. In this embodiment, the fuel can, for example, be formed by a fuel which is also used for the engine of the motor vehicle, in particular gasoline or diesel. Other fuels are possible, however. The fuel is fed to the combustion chamber 10 by means of a fuel delivery device 11, as illustrated schematically by an arrow 12. The fuel delivery device 11 can be formed by a metering pump in a known manner, for example. However, other fuel delivery devices are also possible. The combustion air is fed to the combustion chamber 10 by a combustion air blower 13 (illustrated schematically in FIG. 1), as illustrated schematically by arrows 14.

The hot combustion exhaust gases produced in the combustion chamber 10 are passed through a heat exchanger 15, as illustrated schematically by arrows 16. In the heat exchanger 15, at least a large part of the heat released is transferred from the combustion exhaust gases to a heating medium, which is likewise passed along a flow path via the heat exchanger 15, as illustrated schematically by arrows 17. The cooled combustion exhaust gases are discharged via an exhaust gas outlet, as illustrated schematically by an arrow 18. The heated heating medium is fed via an appropriate line system to an area to be heated, which can be formed by the interior of a vehicle for example, as illustrated schematically by the arrow 19 in FIG. 1.

The mass flow of the heating medium along the flow path through the heat exchanger 15 and to the area to be heated is produced by a heating medium blower 20. The heating medium blower 20 and the combustion air blower 13 are driven by a common drive 21. The common drive 21 can be formed by an electric motor, for example. In the embodiment illustrated, the heating medium blower 20 and the combustion air blower 13 are coupled to the common drive in such a way that a rotational speed of the heating medium blower 20 bears a fixed relationship to a rotational speed of the combustion air blower 13. The combustion air blower 13 and the heating medium blower 20 can be coupled to the common drive 21 in such a way, for example, that both have the same rotational speed, but different rotational speeds are also possible. The coupling can be implemented by means of a common drive shaft, for example.

A sensor 22 for monitoring the mass flow of the heating medium is arranged in the flow path of the heating medium. The sensor 22 can be formed by a sensor which measures the mass flow of the heating medium, for example. A sensor of this kind, which measures the mass flow of the heating medium directly, can be arranged not only in the flow path of the heating medium after emergence from the heat exchanger, as illustrated in FIG. 1, but also at other points in the flow path, in particular in the flow path of the heating medium before entry to the heat exchanger, for example. In the embodiment illustrated, however, the sensor 22 is formed by a temperature sensor which is arranged in the flow path of the heated heating medium downstream of the heat exchanger 15. The temperature sensor measures the temperature of the heated heating medium. In this way, the mass flow of the heating medium is monitored indirectly, as will be described in greater detail below.

The sensor 22, the common drive 21 and the fuel delivery device 11 are connected by respective connecting lines to a controller 23, which is designed to control the operation of the heater. The controller 23 and the fuel delivery device 11 are designed in such a way that the fuel delivery device 11 can be operated at different delivery rates, i.e. that different quantities of fuel per unit time can be delivered to the combustion chamber. In the case where the fuel delivery device 11 is formed by a metering pump, this can be implemented by control at different clock frequencies, for example.

The combustion air supply and the combustion air blower 13 are designed in such a way that the combustion air fed into the combustion chamber 10 per unit time is determined by the rotational speed of the combustion air blower 13. The combustion air factor λ of the conversion process in the combustion chamber 10 is therefore determined by the rotational speed of the combustion air blower 13 and the delivery rate of the fuel delivery device 11. To ensure that a particular combustion air ratio λ is present at a predetermined delivery rate of the fuel delivery device 11, the combustion air blower 13 must thus have a predetermined rotational speed. It should be noted that this relationship pertains only at a predetermined air density of the combustion air supplied and that the combustion air factor λ would shift toward lower values with decreasing air density (i.e. toward a richer combustion mixture). As is known, a decreasing air density occurs especially as a function of the absolute height above sea level.

Since the heating medium blower 20 and the combustion air blower 13 are coupled to the common drive 21, a change in the rotational speed of the common drive 21 always leads both to a change in the mass flow of the heating medium and to a change in the mass flow of the combustion air. At a predetermined delivery rate of the fuel delivery device 11 (and at a constant combustion air density), a change in the rotational speed of the common drive thus leads to a change in the combustion air factor λ. If a particular predetermined combustion air factor λ is to be achieved at a given delivery rate of the fuel delivery device 11, this directly determines the required rotational speed of the combustion air blower 13 (and hence of the common drive 21). Since the heating medium blower 20 is also driven by means of the common drive 21, this also determines the mass flow of the heating medium.

Figure 2:
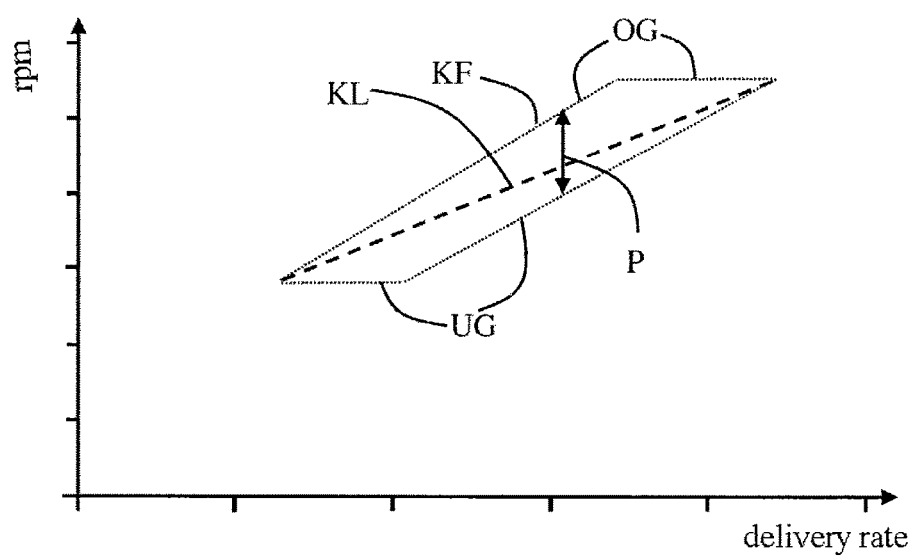
FIG. 2 is a schematic representation of a characteristic operating interval in this embodiment.
Figure 3:
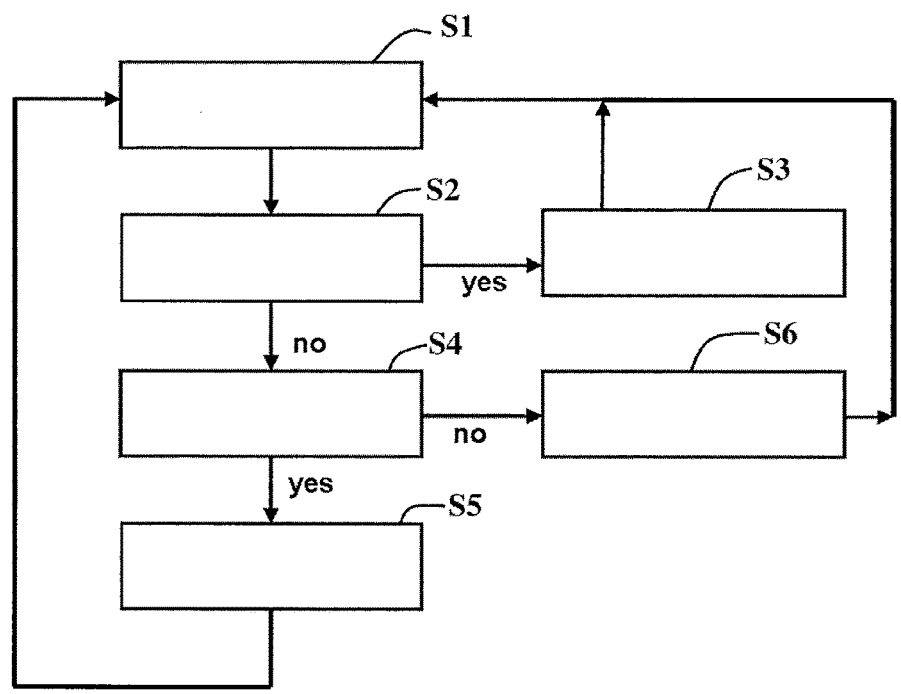
FIG. 3 is a schematic flow diagram intended to illustrate the control function in this embodiment.

FIG. 2 shows a schematic illustration in which the delivery rate of the fuel delivery device 11 is plotted on the horizontal axis (x axis) and the rotational speed of the common drive is plotted on the vertical axis (y axis). In the case of known heaters, the rotational speed of a drive for a combustion air blower is adjusted in accordance with a delivery rate of a fuel delivery device in such a way that the system is adjusted to a particular nominal value of the combustion air factor λ with a view to the best possible combustion process. The line KL represented by dashes in FIG. 2 is obtained in this case. Adjustment in this way thus leads to a corresponding predetermined rotational speed of the common drive 21 and hence also to a predetermined rotational speed of the heating medium blower 20 for each (permissible) delivery rate of the fuel delivery device 11.

In the present embodiment, in contrast, the controller 23 is set up in such a way that it does not adjust to a predetermined λ characteristic curve but to a λ operating characteristic field KF illustrated in dotted lines in FIG. 2. In other words, this embodiment permits a situation where, at a given delivery rate of the fuel delivery device 11, the common drive 21 (and hence the combustion air blower 13) can be operated at rotational speeds in a rotational speed range which corresponds to the corresponding extent of the operating characteristic field KF in the vertical direction. A situation in which various λ values occur within the predetermined limits is therefore permitted. Owing to the different rotational speeds of the common drive 21 which are permitted at a predetermined delivery rate, as illustrated schematically by the arrow P in FIG. 2, there is thus also the possibility of varying the rotational speed of the heating medium blower 20 within a predetermined range. At a predetermined delivery rate of the fuel delivery device 11 (which approximately determines the internal heat output in the heater), there is thus the possibility of increasing or reducing the resulting mass flow of the heating medium within a predetermined range. The delivery rate of the fuel delivery device 11 can be defined, for example, by means of a target temperature of the area to be heated, by means of a setpoint heat output which is input by a user, by means of the difference between the target temperature in the space to be heated and a prevailing actual temperature or the like.

It should be noted that the control process described below relates to operation of the heater 1 in a state of continuous operation or in normal operation and not a starting process of the heater immediately after being put into operation on a particular occasion.

The control process is described below with reference to FIGS. 2 and 3. According to the embodiment, the controller 23 controls the common drive 21 in such a way that it is always operated initially at the lowest permitted rotational speed for the predetermined delivery rate of the fuel delivery device 11. This lowest permitted rotational speed is determined by the respective lower limit UG of the operating characteristic field KF. In a step S1, the controller 23 detects the signal of the sensor 22. In a step S2, the controller 23 checks the signal of the sensor 22 to determine whether a sufficient mass flow of the heating medium is being achieved. In the case where the sensor 22 measures the mass flow of the heating medium directly, the controller 23 compares the mass flow determined with a setpoint. In the case implemented in the embodiment illustrated, in which the sensor 22 is a temperature sensor, the temperature of the heated heating medium emerging from the heater 1 is compared with a reference value stored in the controller 23. If the measured temperature exceeds the reference value, the controller 23 infers that the existing mass flow of the heating medium is not sufficient to dissipate the heat released in the heater 1 to the space to be heated. Instead of the two possibilities described for monitoring the mass flow of the heating medium or in addition thereto, monitoring can also be accomplished by means of one or more other sensors which allow the mass flow of the heating medium to be inferred.

If the controller 23 comes to the conclusion in step S2 that the mass flow of the heating medium is sufficient ("yes"), a check is made in step S3 to determine whether the rotational speed of the common drive already corresponds to the lower limit UG (see FIG. 2). If the rotational speed already corresponds to the lower limit UG, the controller 23 returns to step S1. If the rotational speed is higher than the lower limit UG, the controller lowers the rotational speed (e.g. by a predetermined amount) in step S3 and only then returns to step S1.

If the controller 23 comes to the conclusion in step S2 that the mass flow of the heating medium is too low ("no"), i.e. an insufficient amount of the heat released for heating is being delivered to the area to be heated, a check is made in a step S4 to determine whether the rotational speed of the common drive 21 is less than the upper limit OG in the operating characteristic field KF for the existing delivery rate of the fuel delivery device 11. If the rotational speed of the common drive 21 is less than the upper limit OG ("yes"), the rotational speed is increased in a step S5 (e.g. by a predetermined amount), and the controller 23 then returns to step S1.

If the controller 23 ascertains in step S4 that the rotational speed already corresponds to the upper limit OG ("no"), the delivery rate of the fuel delivery device 11 is reduced in a step S6, and the controller 23 then returns to step S1.

The control of the heater 1 in the manner described ensures that the common drive 21 only ever operates the heating medium blower 20 at a blower power that is required for a sufficient mass flow of the heating medium at all delivery rates of the fuel delivery device 11. This means that the heating medium blower 20 is always operated at the lowest possible blower power. In this way, the mean electric power consumption of the heater 1, which is averaged over all possible applications and operating conditions, is significantly reduced, and the noise level caused by the flow of the heating medium is reduced to a minimum.

The permitted operating characteristic field KF is stored in the controller. The operating characteristic field is chosen in such a way that the heater exhibits permitted characteristics in respect of the combustion process and emission limits (soot, CO etc.) in all states allowed by the operating characteristic field KF. All possible additional influences on the fluctuation of the combustion air factor λ must be taken into account when defining the operating characteristic field KF.

Since rotational speeds of the common drive up to the upper limit OG are permitted in the control of the heater 1 in the manner described, the heat output provided in the heater 1 can be delivered more effectively into the area to be heated in the case of adverse conditions (e.g. high levels of flow resistance in the flow path of the heating medium), as compared with a heater which adjusts to a predetermined λ characteristic curve.

The control of the heater 1 in the manner described furthermore ensures that the controller 23 compensates for a change in the air density even without an additional air density sensor or altitude sensor. As the air density of the combustion air decreases, the combustion air ratio λ for a given delivery rate of the fuel delivery device 11 and a given rotational speed of the common drive 21 falls. At the same time, however, the mass flow of the heating medium falls owing to the likewise decreasing density of the heating medium and, as a result, the heat released is also no longer transported into the space to be heated to a sufficient extent. As a consequence, the rotational speed of the common drive 21 is increased owing to the above-described control, and the λ value is also increased again due to the increase in the rotational speed of the combustion air blower.

Thus, a compact and low-cost heater is made available, said heater exhibiting a lower power consumption and a lower noise level and, at the same time, automatically compensating for changes in the air density of the combustion air.

In a modified version of the embodiment described, the monitoring of the mass flow of the heating medium is accomplished by means of two temperature sensors, as described below.

Since the modified version corresponds completely in other respects to the embodiment described, only the differences in the monitoring of the mass flow of the heating medium are described below. According to the modified version, the sensor 22 is designed as a temperature sensor, which once again measures the temperature of the heated heating medium during or after emergence from the heat exchanger 15 (exit temperature). However, a temperature sensor 24 which measures the temperature of the heating medium before or during entry to the heat exchanger 15 (intake temperature) is additionally provided, as illustrated in broken lines in FIG. 1. The additional temperature sensor 24 is likewise connected to the controller 23, allowing the latter to read off the measured temperature value. The controller 23 determines the temperature difference ΔT between the temperature measured by sensor 22 (exit temperature) and the temperature measured by temperature sensor 24 (intake temperature). The controller 23 also has available information on the delivery rate of the fuel delivery device 11. If the efficiency of the conversion process in the combustion chamber 10 is known, the quantity of heat released per unit time $\dot{Q}$ can be obtained from the delivery rate of the fuel delivery device 11. If the specific heat capacity c of the heating medium is known, the mass flow $\dot{m}$ can then be determined from these variables using the equation $$\dot{m} = \frac{\dot{Q}}{c \cdot \Delta T}.$$

In the modified version, assessment of whether the mass flow determined is sufficient or too low is again accomplished by comparing the value determined with a reference value stored in the controller. If the reference value is undershot, the mass flow is too low. In the modified version, control of the heater by the controller 23 is once again performed in the manner described in relation to the embodiment.

As compared with a case in which a heater is controlled in such a way that the rotational speed of the combustion air blower is adjusted in accordance with the respective delivery rate of the fuel delivery device in such a way that a predetermined fixed combustion air ratio λ is obtained, the heater described and the method described for operating a heater have a number of advantages. If the combustion air blower and the heating medium blower are coupled by means of a common drive, the dimensioning of the heating medium blower during the development of the heater in the case of adjustment to a predetermined λ characteristic curve would have to be such that a sufficient mass flow of the heating medium was achieved for all applications and operating states to be considered since the respective rotational speed of the heating medium blower would be predetermined owing to the delivery rate of the fuel delivery device. The heating medium blower would thus have to be designed to ensure that the heat output generated was introduced into the area to be heated, i.e. that a sufficient mass flow of the heating medium was achieved, under all conditions. The mass flow of the heating medium achieved during operation depends, in particular, on the levels of flow resistance in the flow path of the heating medium, which differ considerably in different applications (e.g. in different vehicles). Moreover, the mass flow of the heating medium which is achieved is also subject to considerable fluctuations connected with operation, tolerances and the particular application.

In order to ensure a sufficient mass flow of the heating medium under all conditions to be considered, the heating medium blower in the case of adjustment to a fixed λ characteristic curve would have to be designed to provide a high blower power in order to achieve a sufficient mass flow of the heating medium even in the case of the most unfavorable conditions. Owing to this design, however, the heater would be operated at a blower power of the heating medium blower which was significantly higher than required in many operating states and applications. This would lead both to an undesirably high power consumption and to an undesirably high noise level due to flow noises of the heating medium. In the solution described, in which different ratios between the quantity of fuel fed to the combustion chamber and the quantity of combustion air fed to the combustion chamber (i.e. different combustion air ratios λ) are permitted, these disadvantages do not occur.

The invention claimed is:

1. A heater, in particular for mobile use, having:
    a combustion chamber for converting fuel with combustion air in order to release heat,
    a heat exchanger for transferring at least some of the heat released to a heating medium to be heated,
    a fuel delivery device for feeding fuel to the combustion chamber,
    a combustion air blower for feeding combustion air to the combustion chamber,
    a heating medium blower for delivering the heating medium,
    a common drive for the combustion air blower and the heating medium blower,
    at least one sensor for monitoring a mass flow of the heating medium,
    a controller, which controls the fuel delivery device and the common drive,
    characterized in that the controller is designed to vary the ratio between the quantity of heating medium and the quantity of fuel fed to the combustion chamber and the ratio between the quantity of fuel fed to the combustion chamber and the quantity of combustion air fed to the combustion chamber in dependence of the mass flow of the heating medium, and
    wherein the controller is designed to increase the rotational speed of the common drive while the delivery rate of the fuel delivery device remains the same, if the mass flow of the heating medium is too low.

2. The heater as claimed in claim 1, characterized in that the controller is designed to vary the rotational speed of the common drive within a rotational speed range (KF) predetermined for the delivery rate of the fuel delivery device.

3. The heater as claimed in claim 2, characterized in that the controller is designed to operate the common drive at a rotational speed which corresponds to a lower limit (UG) of the rotational speed range (KF), and to increase the rotational speed only if the mass flow of the heating medium is too low.

4. The heater as claimed in claim 2, characterized in that the controller is designed to reduce the delivery rate of the fuel delivery device if the mass flow of the heating medium is too low and the rotational speed of the common drive corresponds to an upper limit (OG) of the rotational speed range (KF).

5. The heater as claimed in claim 1, characterized in that the at least one sensor for monitoring the mass flow of the heating medium is a temperature sensor for detecting the temperature of the heated heating medium.

6. The heater as claimed in claim 1, characterized in that a temperature sensor for detecting the temperature of the heating medium is provided upstream of the heat exchanger.

7. The heater as claimed in claim 1, characterized in that the heater is designed as an air heater, in which the heat released is transferred in the heat exchanger to air as the heating medium to be heated.

\* \* \* \* \*